United States Patent
Huang-Fu et al.

(10) Patent No.: US 11,246,054 B2
(45) Date of Patent: Feb. 8, 2022

(54) INTERWORKING BETWEEN EVOLVED PACKET SYSTEM (EPS) SESSION MANAGEMENT (ESM) AND 5G SESSION MANAGEMENT (5GSM)

(71) Applicant: MEDIATEK INC., Hsinchu (TW)

(72) Inventors: Chien-Chun Huang-Fu, Hsinchu (TW); Shang-Ru Mo, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 30 days.

(21) Appl. No.: 16/828,090

(22) Filed: Mar. 24, 2020

(65) Prior Publication Data

US 2020/0322834 A1    Oct. 8, 2020

Related U.S. Application Data

(60) Provisional application No. 62/827,910, filed on Apr. 2, 2019.

(51) Int. Cl.
*H04W 28/02* (2009.01)
*H04W 76/10* (2018.01)

(52) U.S. Cl.
CPC ....... *H04W 28/0268* (2013.01); *H04W 76/10* (2018.02)

(58) Field of Classification Search
CPC combination set(s) only.
See application file for complete search history.

(56) References Cited

U.S. PATENT DOCUMENTS

2020/0275331 A1* 8/2020 Kim ................. H04W 36/00

FOREIGN PATENT DOCUMENTS

| CN | 108632917 A | 10/2018 | |
| WO | WO 2018/026169 A1 | 2/2018 | |
| WO | WO-2020199397 A1 * | 10/2020 | ........ H04W 36/0033 |

OTHER PUBLICATIONS

Qualcomm, Update of Error Handling for Mapped EPS bearer contexts IE (Year: 2019).*
International Search Report and Written Opinion dated Jun. 30, 2020 in PCT/CN2020/082904, 9 pages.
Qualcomm Incorporated, et al., "Update of error handling for Mapped EPS bearer contexts IE," 3GPP TSG CT WG1 Meeting #115 C1-191699, 2019, 16 pages.

(Continued)

*Primary Examiner* — Ayanah S George
(74) *Attorney, Agent, or Firm* — Oblon, McClelland, Maier & Neustadt, L.L.P.

(57) ABSTRACT

A method can include receiving a "create new evolved packet system (EPS) bearer" operation code in a mapped EPS bearer contexts information element (IE) in a first protocol data unit (PDU) session modification command message for creating a mapped EPS bearer context at a user equipment (UE) in a wireless communication system, and when there is neither a quality of service (QoS) flow descriptions IE in the first PDU session modification command message indicating a QoS flow description corresponding to an EPS bearer identity (EBI) in the mapped EPS bearer context, nor an existing QoS flow description at the UE corresponding to the EBI included in the mapped EPS bearer context, sending a PDU session modification request message including a mapped EPS bearer contexts IE to delete the mapped EPS bearer context.

20 Claims, 9 Drawing Sheets

(56) References Cited

OTHER PUBLICATIONS

Qualcomm Incorporated, et al., "Update of error handling for Mapped EPS bearer contexts IE," 3GPP TSG CT WG1 Meeting #115 C1-191544, 2019, 16 pages.
Qualcomm Incorporated, "Update of error handling for Mapped EPS bearer contexts IE," 3GPP TSG CT WG1 Meeting #115 C1-191105, 2019, 12 pages.
Combined Taiwanese Office Action and Search Report dated Jun. 3, 2021 in Taiwanese Patent Application No. 109110497 (with English translation of categories of cited documents), 6 pages.
Combined Taiwanese Office Action and Search Report dated Mar. 26, 2021 in Taiwanese Patent Application No. 109110497 (with English translation of categories of cited documents), 6 pages.

* cited by examiner

US 11,246,054 B2
// 1

INTERWORKING BETWEEN EVOLVED PACKET SYSTEM (EPS) SESSION MANAGEMENT (ESM) AND 5G SESSION MANAGEMENT (5GSM)

INCORPORATION BY REFERENCE

This present application claims the benefit of U.S. Provisional Application No. 62/827,910, "Enhancement of Parameter Handling for ESM 5GSM Interworking" filed on Apr. 2, 2019, which is incorporated herein by reference in its entirety.

TECHNICAL FIELD

The present disclosure relates to wireless communications, and specifically relates to session management with interworking between fifth generation system (5GS) and evolved packet system (EPS).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Geographical coverage of 5G New Radio (NR) access network connected to a 5G core (5GC) network is limited when 5G system (5GS) is newly introduced. A mobile device moves out of a coverage of the NR access network served by the 5GC network can rely on another radio access technology (e.g., evolved universal terrestrial radio access (E-UTRA)) connected to an evolved packet core (EPC) network in an evolved packet system (EPS). Interworking between the 5GC and the EPC enables a mobile device user to have wide-area mobility while retaining a stable IP address.

SUMMARY

Aspects of the disclosure provide a method. The method can include receiving a "create new evolved packet system (EPS) bearer" operation code in a mapped EPS bearer contexts information element (IE) in a first protocol data unit (PDU) session modification command message for creating a mapped EPS bearer context at a user equipment (UE) in a wireless communication system, and when there is neither a quality of service (QoS) flow descriptions IE in the first PDU session modification command message indicating a QoS flow description corresponding to an EPS bearer identity (EBI) in the mapped EPS bearer context, nor an existing QoS flow description at the UE corresponding to the EBI included in the mapped EPS bearer context, sending a PDU session modification request message including a mapped EPS bearer contexts IE to delete the mapped EPS bearer context.

In an embodiment, a PDU session modification complete message is sent in response to receiving the PDU session modification command message. In an embodiment, it is determined whether there is the QoS flow descriptions IE in the first PDU session modification command message indicating the QoS flow description corresponding to the EBI in the mapped EPS bearer context. In an embodiment, it is determined whether there is the existing QoS flow description at the UE corresponding to the EBI included in the mapped EPS bearer context.

In an embodiment, the method can further include processing one or more QoS rules in a QoS rules IE or one or more QoS flow descriptions in a QoS flow descriptions IE included in the PDU session modification command message. In an embodiment, a second PDU session modification command message including a mapped EPS bearer contexts IE to delete the mapped EPS bearer context is received, and the mapped EPS bearer context is deleted. In an embodiment, the method further includes deleting the mapped EPS bearer context locally without receiving a second PDU session modification command message including a mapped EPS bearer contexts IE to delete the mapped EPS bearer context.

Aspects of the disclosure provide an apparatus including circuitry. The circuitry can be configured to receive a "create new evolved packet system (EPS) bearer" operation code in a mapped EPS bearer contexts IE in a first PDU session modification command message for creating a mapped EPS bearer, and when there is neither a QoS flow descriptions IE in the first PDU session modification command message indicating a QoS flow description corresponding to an EBI in the mapped EPS bearer context, nor an existing QoS flow description corresponding to the EBI included in the mapped EPS bearer context, send a PDU session modification request message including a mapped EPS bearer contexts IE to delete the mapped EPS bearer context.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
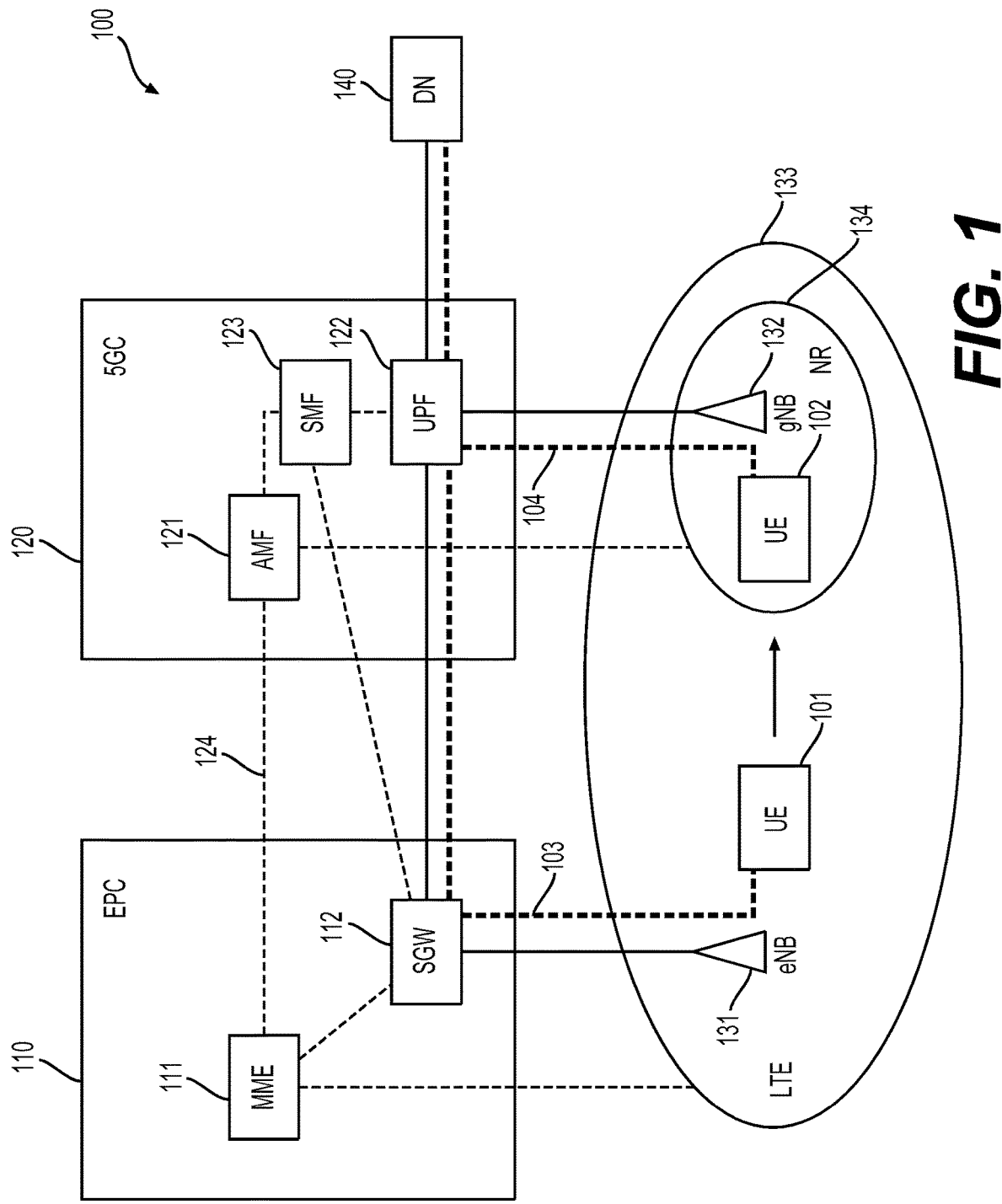
FIG. 1 shows a wireless communication system 100 according to an embodiment of the disclosure.

FIG. 1 shows a wireless communication system 100 according to an embodiment of the disclosure. The system 100 includes an evolved packet core (EPC) 110 and a fifth generation core (5GC) 120 that interwork with each other. The EPC 110 is connected to a first base station 131 implementing Long Term Evolution (LTE) radio access technology. For example, the first base station 131 can be an eNB 131 implementing the evolved universal terrestrial radio access (E-UTRA) air interface as specified in the 3rd Generation Partnership Project (3GPP) LTE standards. The 5GC 120 is connected to a second based station 132 implementing fifth generation (5G) New Radio (NR) access technology or other non-3GPP access technology. For example, the second base station 132 can be a gNB 132 implementing the NR air interface as specified in the 3GPP NR standards. The eNB 131 can have a coverage 133 overlapping a coverage 134 of the gNB 132. The EPC 110 and the eNB 131 form an evolved packet system (EPS) 151 while the 5GC 120 and the gNB 132 form a 5G system (5GS) 152.

The EPC 110 can include a mobility management entity (MME) 111, and a serving gateway (SGW) 112. The MME 111 can be configured to perform bearer activation/deactivation operations, and terminate non-access stratum (NAS) signaling from a user equipment (UE) served by the eNB 131. The SGW 112 can be configured to route and forward user data packets to and from UEs served by the eNB 131. In coordination with the MME 111, the SGW 112 can serve as a mobility anchor for user plane during inter-eNB handovers.

The 5GC 120 can include an access and mobility management function (AMF) 121, a user plane function (UPF) 122, and a session management function (SMF) 123. The AMF 121 communicates with UEs served by the gNB 132 using 5GC NAS protocol. For example, different from the MME 111, the AMF 121 does not handle session management. Instead, the AMF 121 forwards session management related signaling messages between UEs served by the gNB 132 and the SMF 123. In addition, the AMF 121 can exchange UE contexts (e.g., session contexts) with the MME 111 via an interface 124 (e.g., N26 interface specified in 3GPP standards).

The SMF 123 is configured to manage UE sessions passing through the UPF 122. For example, the SMF 123 can be configured to perform functions of establishment, modification, and release of individual sessions, and allocation of IP addresses per session. The sessions managed by the SMF 123 can be sessions between the UPF 122 and UEs served by the gNB 132, or can be sessions between the UPF 122 and UEs served by the eNB 131 via the SGW 112. For example, the SMF 123 and the UPF 122 can implement packet data network (PDN) gateway (PGW) control plane function (PGW-C) and PGW user plane function (PGW-U), respectively, to enable sessions being established between the SGW 112 and the UPF 122.

The UPF 122 is configured to process and forward user data under the control of the SMF 123. For example, the UPF 122 can serve as an anchor point for connecting UEs served by the system 100 towards an external data network (DN) 140 (e.g., the Internet). IP packets with an IP address belonging to a specific UE served by the UPF 122 can be routable from the DN 140 to the UPF 122 while the specific UE is moving around within coverage of the system 100.

In an example, a UE 101 out of the coverage 134 but within the coverage 133 is served by the EPC 110. The UE 101 can be a mobile phone, a laptop, a vehicle, and the like. The UE 101 is capable of operating in EPC NAS mode or 5GC NAS mode. At current location shown in FIG. 1, the UE 101 can be served to the EPC 110, and operate in EPC NAS mode. For example, data can be transmitted between the UE 101 and the SGW 112 via an S1-U interface, while NAS messages for control signaling can be transmitted between the UE 101 and the MME 111 via an S1-MME interface. Thus, the EPC NAS mode is also referred to as S1 mode. A session 103 (referred to as a PDN connection 103, or EPS session 103) can be established between the UE 101 and the UPF 122 via the SGW 112.

As shown, the UE 101 can move from the eNB 131 to the gNB 132, and enters the coverage 134 of the gNB 132. The UE 101 at the new location within the coverage 134 is shown as UE 102. During the moving, triggered by a configuration at the UE 101, the UE 101 can perform a handover procedure to switch from the EPS to the 5GS. During the handover procedure, the PDN connection 103 of UE 101 can be switched to a new session 104 (referred to as a protocol data unit (PDU) session 104) established between the UE 102 and the UPF 122. As the UPF 122 serves as an anchor point connecting the DN 140, the PDN connection 103 can be maintained while being switched to the PDU session 104 without changing an IP address assigned for the UE 101 (or 102).

The UE 102 is served by the 5GC 120, and operates in 5GC NAS mode. For example, data can be transmitted between the UE 102 and the UPF 122, while NAS messages for control signaling can be transmitted between the UE 102 and the AMF 121 via an N1 interface. Thus, the 5GC NAS mode is also referred to as N1 mode.

The 5GC 120 and the EPC 110 can interwork with each other to facilitate the above inter-system change of the UE 101 from S1 mode to N1 mode. For example, during the handover procedure, a session context and associated information of the PDN connection 103 can be provided from the MME 111 to the AMF 121. This session context and the associated information may include information, for example, indicating how EPS bears of the PDN connection 103 are mapped to quality of service (QoS) flows of the PDU session 104. The AMF 121 may pass the session context and/or the associated information to the SMF 123. The SMF 123 can accordingly configure the UPF 122 and the gNB 132 to establish the PDU session 104 between the UPF 122 and the gNB 132.

At the UE 101, before the inter-system change from S1 mode to N1 mode takes place, the MME 111 may configure 5G session parameters (including 5G QoS flow parameters) to the UE 101. For example, the PDN connection 103 and the PDU session 104 may have different structures. The PDN connection 103 can include EPS bears each associated with QoS parameters and traffic flow templates (TFTs) (including packet filters) defining the respective EPS bearers, while the PDU session 104 can include QoS flows each associated with QoS rules and QoS flow description defining the respective QoS flows. Accordingly, the 5GS session parameters can indicate to the UE 101 how the EPS bearers are mapped to the QoS flows by providing the mapping relationship between the EPS bearers and the QoS flows as well as suitable QoS related information for defining the QoS flows. Based on the received 5G session parameters (that are associated with the respective EPS bearers), upon the inter-system change from S1 mode to N1 mode, the UE 101 can transfer the PDN connection 103 to the PDU session 104.

At the UE 102, after the inter-system change from S1 mode to N1 mode, the UE 102 may store EPS session parameters (including EPS bearer contexts) associated with the PDN connection 103 to prepare for possible inter-system change from N1 mode to S1 mode. For example, the stored EPS session parameters can include QoS parameters and TFTs associated with the respective EPS bearers as well as mapping relationship between the QoS flows in the PDU session 104 and respective EPS bearers in a PDN connection. Upon the UE 102 moving away from the gNB 132 and re-entering the coverage 133 of the eNB 131, based on the stored EPS session parameters, the UE 102 can map the QoS flows of the PDU session 104 to respective EPS bearers of the PDN connection.

In addition, upon the inter-system change from N1 mode to S1 mode, the AMF 121 can provide a session context (e.g., including associated EPS bearer context parameters and/or mapping relationship between QoS flows and EPS bearers) corresponding to the PDU session 104 to the MME 111, the PGW-C in the SMF 123, and the PGW-U in the UPF 122. The MME 111 may pass the session context to the SGW 112. The SGW 112, the PFW-C in the SMF 123, and the PGW-U in the UPF 122 may coordinate to establish a PDN connection between the eNB 131 and the UPF 122.

Figure 2:
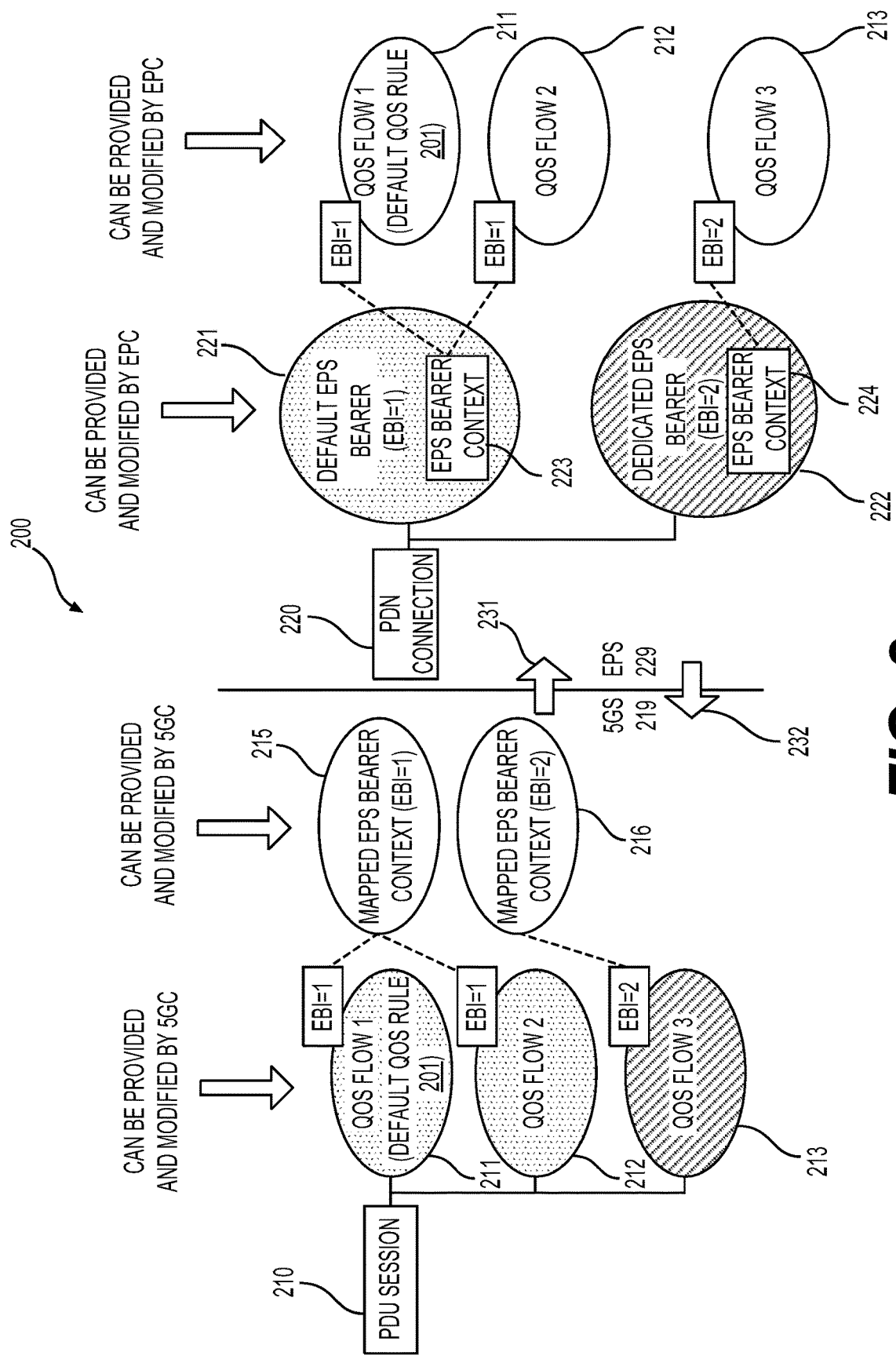
FIG. 2 shows an example of a mapping relationship 200 between a protocol data unit (PDU) session 210 in a 5G system (5GS) 219 and a packet data network (PDN) connection 220 in an evolved packet system (EPS) 229 when inter-system change between N1 mode and S1 mode takes place.

FIG. 2 shows an example of a mapping relationship 200 between a PDU session 210 in a 5GS 219 and a PDN connection 220 in an EPS 229 when inter-system change between N1 mode and S1 mode takes place. The UE 101 (or 102) and the system 100 is used as examples for explanation of FIG. 2. As described with reference to FIG. 1, the UE 101 (or 102) is capable of operation in S1 mode and N1 mode. Also, the EPC 110 and the 5GC allow the UE 101 (or 102) to be served within the serving areas of the EPC 110 and the 5GC 120, respectively.

The PDU session 210 can be established and maintained between the UE 102 and the UPF 122 in FIG. 1. The PDU session 210 includes three QoS flows 211-213. Each QoS flow 211-213 can be characterized by one or more QoS rules. Each QoS rule includes traffic filters associating PDUs to the respective QoS flow. The QoS flow 211 can be associated with a default QoS rule 201 that includes a traffic filter set allowing all uplink packets to pass through. The default QoS rule 201 can be used in case there is no other QoS rule with a packet filter set matching the uplink data packets. The QoS flow 211 is associated with the default QoS rule, and thus is referred to as a default QoS flow, while the QoS flows 212-213 are not associated with a default QoS rule, and thus are referred to as non-default QoS flows.

Each QoS flow 211-213 can further be associated with and characterized by a QoS flow description including QoS related parameters corresponding to the respective QoS flow. In addition, the QoS flow description can include an EPS bearer identity (EBI) for use in inter-system change of the UE 102 from N1 mode to S1 mode. As shown, the QoS flows 211-213 can be associated with EBIs having values of 1, 1, and 2, respectively. Each EBI can be used as an index to associate the respective QoS flow 211-213 to a mapped EPS bearer context 215 or 216.

For example, the default QoS flow 211 and the non-default QoS flow 212 both have a EBI=1, and accordingly are associated to the mapped EPS bearer context 215 having an EBI=1. Similarly, the non-default QoS flow 213 having EBI=2 is associated to the mapped EPS bearer context 216 having EBI=2.

The mapped EPS bearer contexts 215-216 each provide information of an EPS bearer that would be mapped with the corresponding QoS flow(s) when an inter-system change from N1 mode to S1 mode takes place. For example, in addition to the EBI=1, the mapped EPS bearer context 215 can include TFTs and QoS parameters characterizing the respective EPS bearer (EBI=1) to be mapped to the QoS flows 211-212. Similarly, the mapped EPS bearer context 216 can include TFTs and QoS parameters characterizing the respective EPS bearer (EBI=2) to be mapped to the QoS flows 213.

The QoS flows 211-213 can be provided (established) by the 5GC 120. For example, parameters characterizing the QoS flows 211-213 can be provided to the UE 102 while the PDU session 210 is created. During the establishment of the PDU session 210 or the QoS flows 211-213, the mapped EPS bearer contexts 215-216 can also be provided from the 5GC 120, for example, through NAS signaling.

Alternatively, the QoS flows 211-213 and the respective mapped EPS bearer contexts 215-216 can be established at the UE 102 upon inter-system change of the UE 101 from S1 mode to N1 mode. For example, the EPS bearers of EBI=1 and EBI=2 can previously exit when the UE 101 is in S1 mode. Upon the inter-system change from S1 mode to N1 mode, the previous EPS bearers can be mapped to the QoS flows 211-213. Parameters of the previous EPS bearers of EBI=1 and EBI=2 (e.g., TFTs, and associated QoS parameters) can be stored at the UE 102. An association between each of the QoS flows 211-213 and the respective previous EPS bearer can be stored. Thus, instead of using the mapped EPS bearer contexts 215 and 216, the stored associations between the QoS flows and the mapped EPS bearers can be used to fetch information similar to that in the mapped EPS bear contexts 215-216.

Accordingly, in this detailed description, mapped EPS bearer contexts, or parameters or information in the mapped EPS bearer contexts may also be used to refer to parameters or information obtained from the associations between QoS flows and mapped EPS bearers when describing session switches during inter-system changes between N1 mode and S1 mode.

While the PDU session 210 being maintained before an inter-system change from N1 mode to S1 mode takes place, the PDU session 210 may be modified (either initiated by the UE 102 or the 5GC 120). For example, new QoS flows may be added, or existing QoS flows may be removed or modified (e.g., QoS rules of an existing QoS flow may be changed, or removed, or a new QoS rule may be added; a QoS flow description of an existing QoS flow may be removed, replaced, or modified). Under such scenarios, the mapped EPS bear contexts 215-216 can also be modified to adapt the to-be-mapped EPS bearers to match the status of the modified PDU session 210. For example, through NAS signaling, new mapped EPS bearer context may be provided, and existing mapped EPS bearer context may be modified or removed.

The right side of the FIG. 2 shows the PDN connection 220 in the EPS 229. The PDN connection 220 can be established and maintained between the UE 101 and the UPF 122 via the SGW 112 in FIG. 1. The PDN connection 220 can include a default EPS bearer 221 with EBI=1 and a dedicated EPS bearer 222 with EBI=2. Each EPS bearer 221-222 can be characterized by one or more TFTs and a set of QoS parameters. The default EPS bearer 221 can be the first EPS bearer activated when the PDN connection 220 is created, and can stay activated until the PDN connection 220 is terminated even no data is transmitted. The default bearer 221 can typically be set as a non-guaranteed bit rate (non-GBR) type. In contrast, the dedicated EPS bearer 222 can typically be an additional EPS bearer activated on demand after the PDN connection 220 is established. The dedicated EPS bearer 222 can be of a GBR or non-GBR type.

In addition, the default EPS bearer 221 can include none of TFTs, and packets not filtered into the dedicated EPS bearer 222 (or other dedicated EPS bearer, if activated) may be carried in the default bearer 221. In contrast, the dedicated EPS bearer 222 typically includes at least one TFT providing filters for filtering packets that may need QoS treatment different from that of the default EPS bearer 221.

The default EPS bearer 221 of EBI=1 can be associated with an EPS bearer context 223. The EPS bearer context 223 may include QoS related parameters (e.g., QoS parameters, TFTs, or the like) associated with the default EPS bearer 221, and/or parameters associated with the PDN connection 220. As an EPS bearer is a logical session defined by QoS parameters included in an associated EPS bearer context at the UE 101, "an EPS bearer context" can be used to refer to "an EPS bearer" in this detailed description, and in some places, the "EPS bearer" and "EPS bearer context" are used interchangeably.

In addition, the EPS bearer context 223 may be associated with parameters or information of QoS flows which the default EPS bearer 221 would be mapped to when inter-system change from S1 mode to N1 mode takes place. In another example, parameters or information of QoS flows which the default EPS bearer 221 would be mapped to can be included in the EPS bearer context 223 (i.e., the QoS flow description).

For example, as shown in FIG. 2, the default EPS bearer 221 is to be mapped to the QoS flows 211-212 in case an inter-system change of the UE 101 from S1 mode to N1 mode takes place. Corresponding to this configuration, the EPS bearer context 223 can be associated with QoS flow descriptions and/or QoS rules defining the QoS follows 211 and 212.

The dedicated EPS bearer 222 of EBI=2 can be associated with an EPS bearer context 224. The dedicated EPS bearer 222 is to be mapped to the QoS flow 213. Accordingly, corresponding to this configuration, the EPS bearer context 224 can be associated with the QoS flow description and QoS rules corresponding to the QoS follow 213.

The default EPS bearer 221 and the dedicated EPS bearer 222 can be provided by the EPC 110. For example, parameters characterizing the EPS bearer 221 can be provided to the UE 101 when the PDN connection 220 is created, and parameters characterizing EPS bearer 222 can subsequently be added. For example, during the establishment of the PDN connection 220, the EPS bearer contexts 223-224 can be provided from the EPC 110, for example, through NAS signaling.

Alternatively, the EPS bearers 221-222 and the respective associated EPS bearer contexts 223-224 can be established at the UE 101 upon inter-system change of the UE 101 from N1 mode to S1 mode. For example, the QoS flows 211-213 exist previously when the UE 102 is in N1 mode. Upon inter-system change from N1 mode to S1 mode, the previous QoS flows 211-213 can be mapped to the EPS bears 221-222 based on the indication of the mapped EPS bearer contexts 215-216. Parameters of the previous QoS flows 211-213 (e.g., QoS rules and QoS flow descriptions) can be stored at the UE 101. For example, the parameters of the previous QoS flows 211-212 can be associated with the EPS bearer context 223, while the parameters of the previous QoS flow 213 can be associated with the EPS bearer context 224.

Similarly, while the PDN connection 220 being maintained before an inter-system change from S1 mode to N1 mode takes place, the PDN connection 220 can be modified. For example, new EPS bearers can be created, or existing EPS bearers can be modified or removed. Accordingly, the corresponding QoS flow descriptions/QoS rules parameters associated with the EPS bearer context 223-224 can also be modified to adjust the to-be-mapped QoS flows to match the updated status of the modified PDN connection 220.

For example, through NAS signaling, the UE 101 can receive new QoS rule(s) and/or QoS flow description(s) or indications of how to modify existing QoS rules and/or QoS flow descriptions carried in NAS messages. For example, a protocol configuration options (PCO) IE or an extended PCO IE can be received in a modify EPS bearer context request message. For example, the PCO IE or the extended PCO IE can carry one or more QoS rule parameters. Each QoS rule parameter can indicate how to create a new QoS rule or modifying (including deleting and changing) an existing QoS rule. Or, the PCO IE or the extended PCO IE can carry one or more QoS flow description parameters. Each QoS flow description parameter can indicate how to create or modify a QoS flow description. Each QoS flow description parameter can indicate an EBI that associates the respective QoS flow description (and respective QoS rules) to the target EPS bearer context. Based on the IE in the NAS message for creating or modifying respective QoS rules or QoS flow descriptions, the QoS rule(s) and QoS flow(s) associated with the EPS bearer contexts 223-224 can be modified, or replaced.

As examples, two processes 231 and 232 of session switches between the PDU session 210 and the PDN connection 220 are described below.

Upon inter-system change of the UE 102 from N1 mode to S1 mode takes place, the first session switch process 231 can be performed to switch the PDU session 210 in the 5GS 219 to the PDN connection 220 in the EPS 229. The UE 102 can create the default EPS bearer context 223, and the dedicated EPS bearer context 224 based on the parameters of the mapped EPS bearer contexts 215-216, or the associations between QoS flow and to be mapped EPS bearer if available. The EBI=1 assigned for the default QoS flow 211 (with the default QoS rule 201) becomes the EBI=1 of the default EPS bearer 221. Or, in other words, the default QoS flow 211 is mapped to the default EPS bearer 221. The EBIs (EBI=1, and EBI=2), the QoS parameters, and the TFTs in the mapped EPS bearer contexts 215-216 are used for creating the EPS bearers 221-222, respectively.

In an example, when there is no EBI assigned to the default QoS flow 211, the UE 102 may perform a local release of the PDU session 210. When there is no EBI assigned to the non-default QoS flows 212-213, the UE 102 can locally delete the QoS rules and QoS flow descriptions of the respective non-default QoS flows.

In addition, at the end of the first session switch process 231, the UE 101 can associate an identity of the PDU session 210 with the default EPS bearer context 223, and associate the QoS rules and QoS flow descriptions of the QoS flows 211-213 with the respective EPS bearer contexts 223-224.

Upon inter-system change of the UE 101 from S1 mode to N1 mode takes place, the second session switch process 232 can be performed to switch the PDN connection 220 in the EPS 229 to the PDU session 210 in the 5GS 219. The UE 101 can use the parameters in the EPS bearer contexts 223-224 or QoS rule(s)/QoS flow description(s) associated with the EPS bearer contexts 223-224 to create the PDU session 210. For example, a PDU session identity associated with the default EPS bearer context 223 can be used as that of the PDU session 210. The QoS rules and QoS flow descriptions corresponding to the QoS flows 211-213 associated with the EPS bearer contexts 223-224 can be used to create QoS rules and QoS flow contexts of respective QoS flows 211-213 in the PDU session 210. In addition, at the end of the second session switch process 232, the UE 102 can associate the EBIs, the QoS parameters, and the TFTs of the EPS bearers 221-222 with the respective QoS flows 221-223 in the PDU session 210.

While the UE 102 operates in N1 mode, 5GS session management (5GSM) processes (or procedures) can be performed over a non-access stratum (NAS) signaling connection between the UE 102 and the AMF 121 for PDU connection handling in the UE 102 and in the SMF 123. For example, a 5GS mobility management (5GMM) protocol can operate between the UE 102 and the AMF 121, and be used as a transport protocol. A 5GSM message of a 5GSM protocol can be piggybacked in a 5GMM transport message. For example, the 5GSM message can be transmitted in an information element (IE) in the 5GMM transport message.

The 5GSM processes can include a UE-requested PDU session establishment process for establishing a PDU session, a network-initiated PDU session modification process (may be requested by a UE), and a network-initiated PDU session release process (may be requested by a UE).

Figure 3:
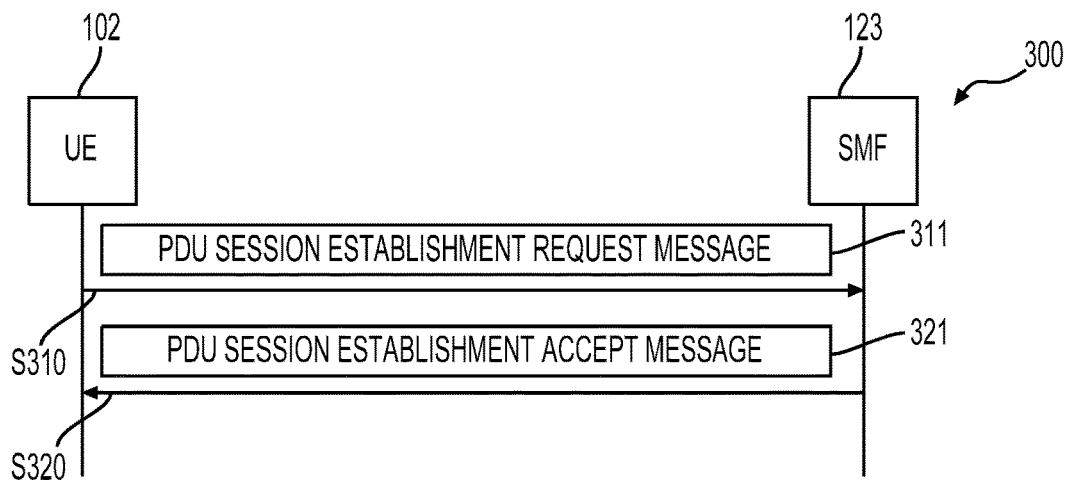
FIG. 3 shows an example user equipment (UE) requested PDU session establishment process 300.

FIG. 3 shows an example UE-requested PDU session establishment process (or procedure) 300. The process 300 can includes steps S310-S320, and be performed between the UE 102 and the SMF 123 to establish a target PDU session.

At S310, a PDU session establishment request message 311 can be transmitted from the UE 102 to the SMF 123. The message 311 may include an associated PDU session ID, a PDU session type IE, a session and service continuity (SSC) mode IE, a maximum number of packet filters the UE 102 supports, a requested data network name (DNN), and the like.

At S320, a PDU session establishment accept message 321 can be transmitted from the SMF 123 to the UE 102. The message 321 can include an authorized QoS rules IE that is set to QoS rules authorized to the target PDU session. In addition, the message 321 may or may not include an authorized QoS flow descriptions IE set to authorized QoS flow descriptions. In an example, the QoS flow descriptions IE is set to authorized QoS flow descriptions and provided when the authorized QoS rules IE indicate at least one GBR QoS flow, or a QoS flow identifier (QFI) is not the same as a 5G QoS identified (5QI) of a QoS flow identified by the QFI. Further, the message 321 may include a mapped EPS bearer contexts IE providing mapped EPS bearer contexts associated with respective QoS flows of the target PDU session when the UE 102 has is capable of and allowed to perform inter-system change from N1 mode to S1 mode.

The UE 102 can store the authorized QoS rules, the authorized QoS flow descriptions (if available), and the mapped EPS bearer contexts (if available) for the target PDU session. In addition, the UE 102 can check the authorized QoS rules, the authorized QoS flow descriptions, and the mapped EPS bearer contexts provided in the PDU session establishment accept message 321 for different types of errors.

Figure 4:
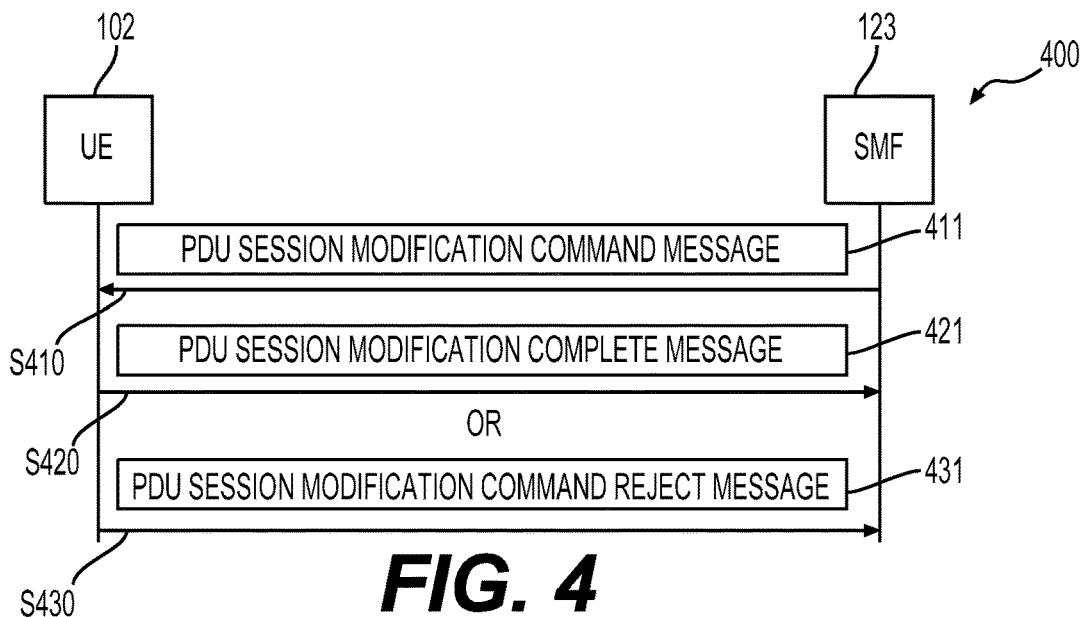
FIG. 4 shows an example network-requested PDU session modification process 400.

FIG. 4 shows an example network-requested PDU session modification process (or procedure) 400. The process 400 can include steps of S410-S420 or S410-S430, and be performed by the UE 102 and the SMF 123 to modify an existing PDU session. The network-requested PDU session modification process 400 can be performed in response to a UE request to modify the existing PDU session. The UE 102 can transmit a PDU session modification request message to the SMF 123 to trigger the PDU session modification process 400.

At S410, a PDU session modification command message 411 can be transmitted from the UE 102 to the SMF 123. The message 411 may include an authorized QoS rules IE set to authorized QoS rules that are to be modified or created at the UE 102. The message 411 may include an authorized QoS flow descriptions IE set to authorized QoS flow descriptions that are to be modified or created at the UE 102. In an example, when a new authorized QoS rule for a new QoS flow is to be created, an authorized QoS flow description for that new QoS flow can be set in the authorized QoS flow descriptions IE if the newly created authorized QoS rules are for a new GBR QoS flow, or a QFI of the new QoS flow is not the same as a 5QI of the QoS flow identified by the QFI.

In addition, to support interworking with the EPS for the PDU session 104, when the mapped EPS bearer contexts of the PDU session 104 at the UE 102 is to be modified, the message 411 may include a mapped EPS bearer contexts IE set to the mapped EPS bearer contexts at the UE 102.

The UE 102 may process the QoS rules in the authorized QoS rules IE sequentially starting with the first QoS rule. For example, the UE 102 can replace previously stored QoS rules, or QoS flow descriptions with received value(s), if any, in the message 411 (modification operation), or remove existing QoS rules or QoS flow descriptions (deletion operation) or create QoS rules or QoS flow descriptions as indicated in the message 411 (creation operation). Similarly, the UE 102 can replace existing mapped EPS bearer contexts with received value(s), if any, in the message 411 (modification operation), or delete existing mapped EPS bearer contexts (deletion operation) or create new mapped EPS bearer contexts as indicated in the message 411 (creation).

In addition, the UE 102 can verify the authorized QoS rules, the authorized QoS flow descriptions, and the mapped EPS bearer contexts provided in the PDU session modification command message 411 for different types of errors. The verification can take place before, after, or during the modification, deletion, or creation operations.

At S420, the UE 102 can transmit a PDU session modification complete message 421 to the SMF 123. Or, at S430, the UE 102 can transmit a PDU session modification command rejection message 431 with a 5GSM cause IE indicating a reason for rejecting the PDU session modification. For example, the 5GSM cause IE may include a value of #26, insufficient resources; #43, invalid PDU session identity; #44, semantic error in packet filter(s); #45, syntactical error in packet filter(s); #83, semantic error in the QoS operation; #84, syntactical error in the QoS operation, or the like.

Figure 5:
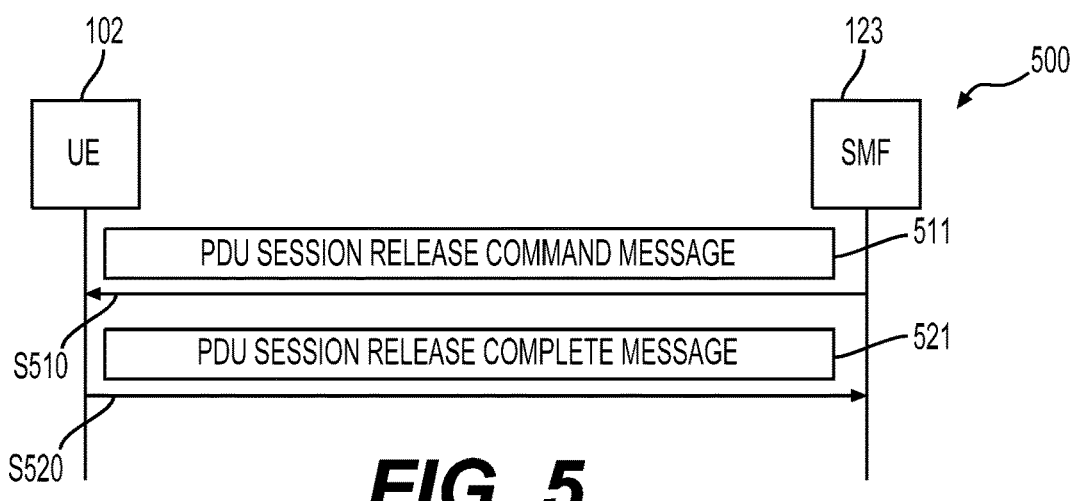
FIG. 5 shows an example network-requested PDU session release process 500.

FIG. 5 shows an example network-requested PDU session release process (or procedure) 500. The process 500 can include steps of S510-S520, and be performed by the UE 102 and the SMF 123 to release an existing PDU session. The process 500 can be performed in response to a UE request to release the existing session.

At S510, a PDU session release command message 511 can be transmitted from the SMF 123 to the UE 102. The message 511 may carry a 5GSM cause IE to indicate a reason for releasing the existing PDU session. The 5GSM cause IE may indicate one of the following cause values: #8, operator determined barring; #26, insufficient resources; #29, user authentication or authorization failed; #36, regular deactivation; #38, network failure; or the like.

At S520, the UE 102 may transport a PDU session release complete message 521 in response to receiving the message 511.

Figure 6:
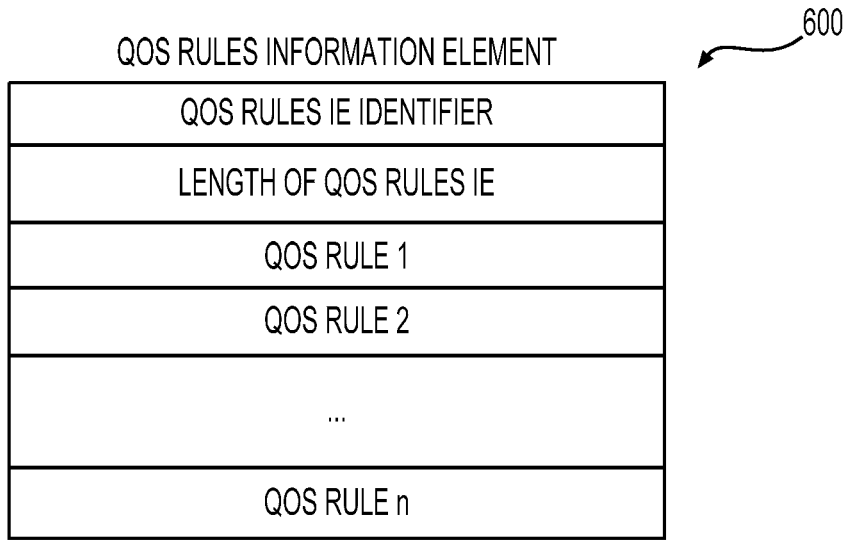
FIG. 6 shows an example of a quality of service (QoS) rules information element (IE) 600.

FIG. 6 shows an example of a QoS rules IE 600. The QoS rules IE 600 can be carried in the PDU session establishment accept message 321 in FIG. 3, or the PDU session modification command message 411 for creating or modifying (including deleting) a QoS rule at the UE 102. As shown, the IE 600 can include a QoS rules IE ID, a length of the QoS rules IE, and a list of QoS rule entries (numbered from 1 to n). A QoS rule entry in a QoS rules IE can be referred to as a QoS rule included or indicated by the QoS rules IE.

Figure 7:
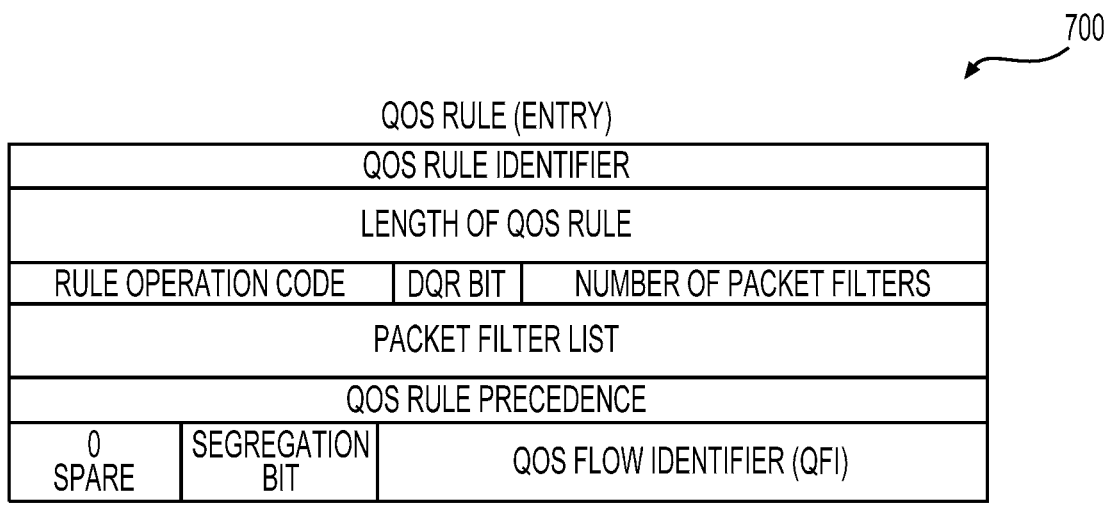
FIG. 7 shows an example of a QoS rule entry 700 included in the QoS rules IE 600.

FIG. 7 shows an example of a QoS rule entry 700 included in the QoS rules IE 600. As shown, the QoS rule entry 700 can include a QoS rule ID, a length of the QoS rule (entry contents), a rule operation code, a default QoS rule (DQR) indication bit, a number of packet filters, a packet filter list, a QoS rule precedence, a segregation bit, and a QFI. For example, the rule operation code can indicate one of the following QoS rule related operations:

Create new QoS rule; Delete existing QoS rule;
Modify existing QoS rule and add packet filters;
Modify existing QoS rule and replace all packet filters;
Modify existing QoS rule and delete packet filters; or
Modify existing QoS rule without modifying packet filters.

For example, in an operation of "Modify existing QoS rule without modifying packet filters", a 5QI of the respective QoS rule can be modified.

Figure 8:
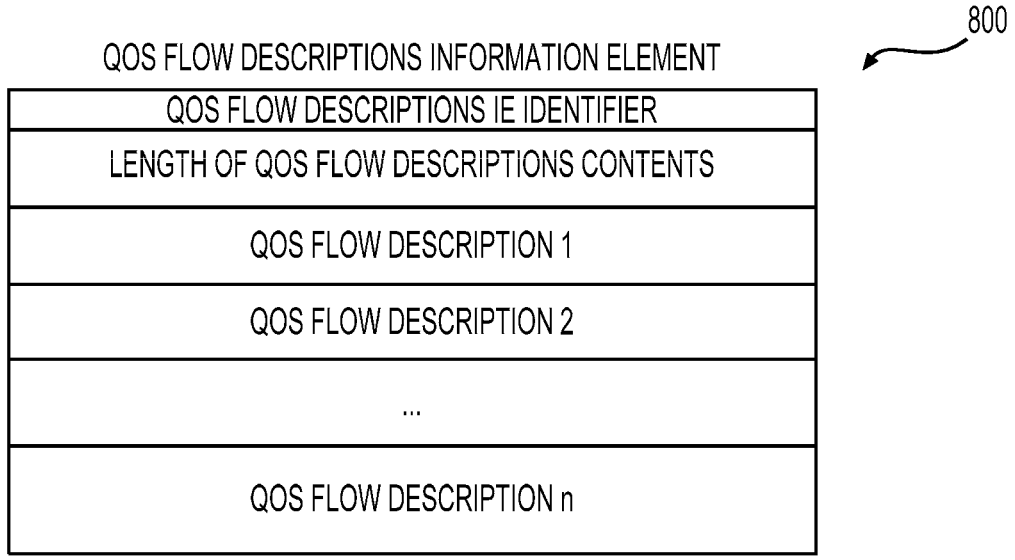
FIG. 8 shows an example of a QoS flow descriptions IE 800.

FIG. 8 shows an example of a QoS flow descriptions IE 800. The QoS flow descriptions IE 800 can be carried in the PDU session establishment accept message 321 in FIG. 3, or the PDU session modification command message 411 for creating or modifying (including deleting) a QoS flow description at the UE 102. As shown, the IE 800 can include a QoS flow descriptions IE ID, a length of the QoS flow descriptions contents, and a list of QoS flow description entries (numbered from 1 to n). A QoS flow description entry in a QoS flow descriptions IE can be referred to as a QoS flow description included or indicated by the QoS flow descriptions IE.

Figure 9:
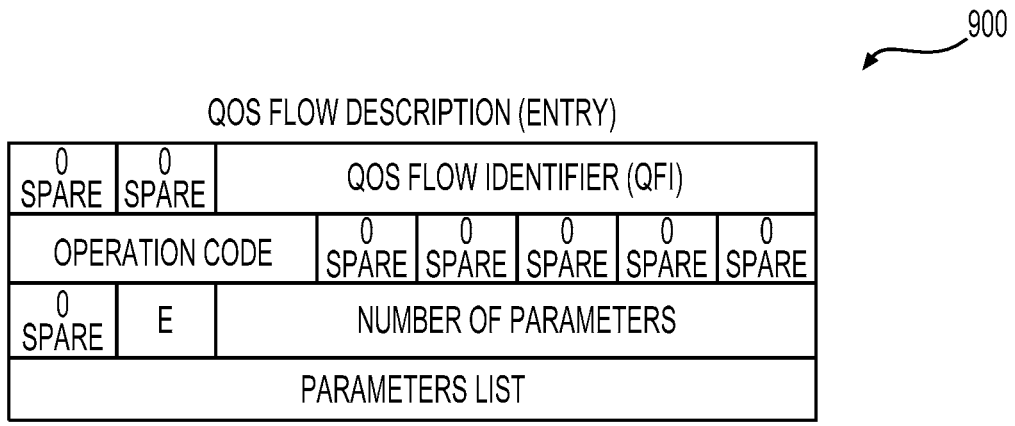
FIG. 9 shows an example of a QoS flow description entry 900 included in the QoS flow descriptions IE 800.

FIG. 9 shows an example of a QoS flow description entry 900 included in the QoS flow descriptions IE 800. As shown, the QoS flow description entry 900 can include a QFI indicating a QoS flow associated with the QoS flow description entry 900, a QoS flow description operation code, an E bit, a number of parameters, and a parameter list.

The QoS flow description operation code can indicate the following operations:

Create new QoS flow description;
Delete existing QoS flow description; or
Modify existing QoS flow description.

For the "modify existing QoS flow description" operation, the E bit can indicate as follows: bit 0, extension of previously provided parameters; or bit 1, replacement of all previously provided parameters. If the E bit is set to "extension of previously provided parameter", and one of the parameters in the new parameters list already exists in the previously provided parameters, the parameter can be set to the new value. The parameter list can indicate an EBI which can be used as an index to associate the QoS flow of the QFI with a mapped EPS bearer context having the EBI. The parameter list can further include one or more of the following parameters: 5QI, guaranteed flow bit rate (GFBR) uplink (UL), maximum flow bit rate (GFBR) downlink (DL), MFBR UL, MFBR DL, or averaging window.

Figure 10:
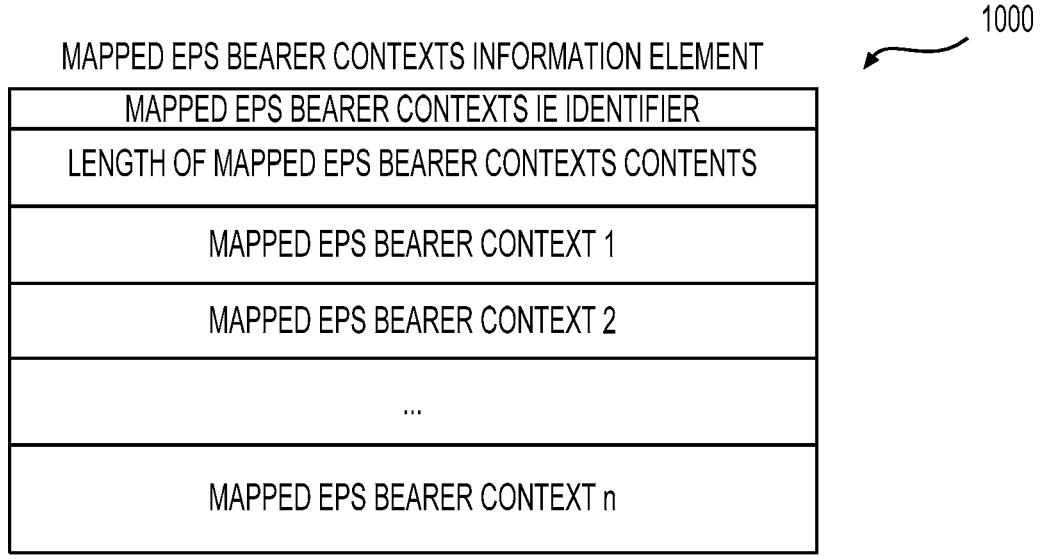
FIG. 10 shows an example of a mapped EPS bearer contexts IE 1000.

FIG. 10 shows an example of a mapped EPS bearer contexts IE 1000. The mapped EPS bearer contexts IE 1000 can be included in the PDU session establishment accept message 321 in FIG. 3, or the PDU session modification command message 411 for creating or modifying (including deleting) a mapped EPS bearer context(s) at the UE 102. As shown, the IE 1000 can include a mapped EPS bearer contexts IE ID, a length of mapped EPS bearer contexts contests, and a list of mapped EPS bearer context entries (numbered from 1 to n). A mapped EPS bearer context entry in a mapped EPS bearer contexts IE can also be referred to as a mapped EPS bearer context included or indicated by the QoS rules IE.

Figure 11:
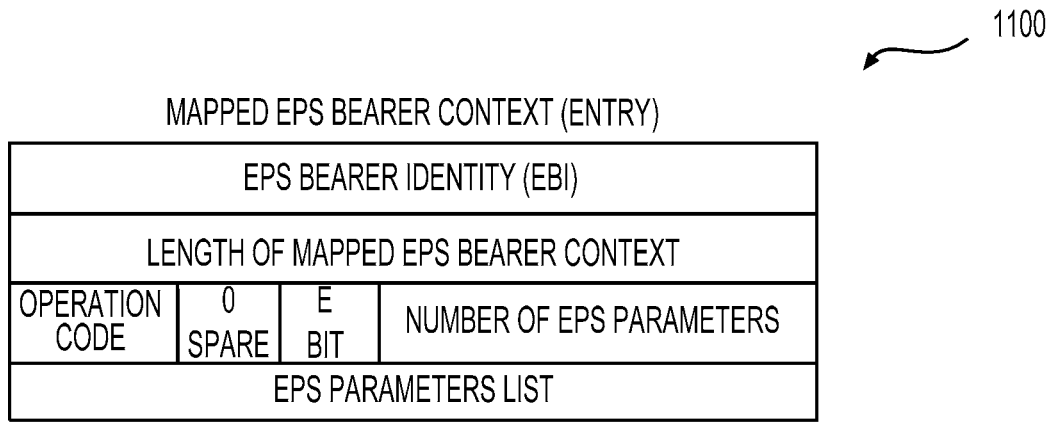
FIG. 11 shows an example of a mapped EPS bearer context entry 1100 in the mapped EPS bearer contexts IE 1000.

FIG. 11 shows an example of a mapped EPS bearer context entry 1100 in the mapped EPS bearer contexts IE 1000. The mapped EPS bearer context entry 1100 can include an EBI for identifying a mapped EPS bearer context that is to be created, deleted or modified, a length of mapped EPS bearer context, a mapped EPS bearer context operation code, an E bit, a mummer of EPS parameters, and a EPS parameters list.

The mapped EPS bearer context operation code can indicate the following operations:

Create new EPS bearer;
Delete existing EPS bearer; or
Modify existing EPS bearer.

For the "create new EPS bearer" operation, the E bit can indicate as follows: bit 0, parameters list is not included; or bit 1, parameters list is included.

The EPS parameters list can include a variable number of EPS parameters. For example, the EPS parameters can include mapped EPS QoS parameters, mapped extended EPS QoS parameters, a traffic flow template, an access point name aggregate maximum bit rate (APN-AMBR), an extended APN-AMBR, or the like.

Figure 12:
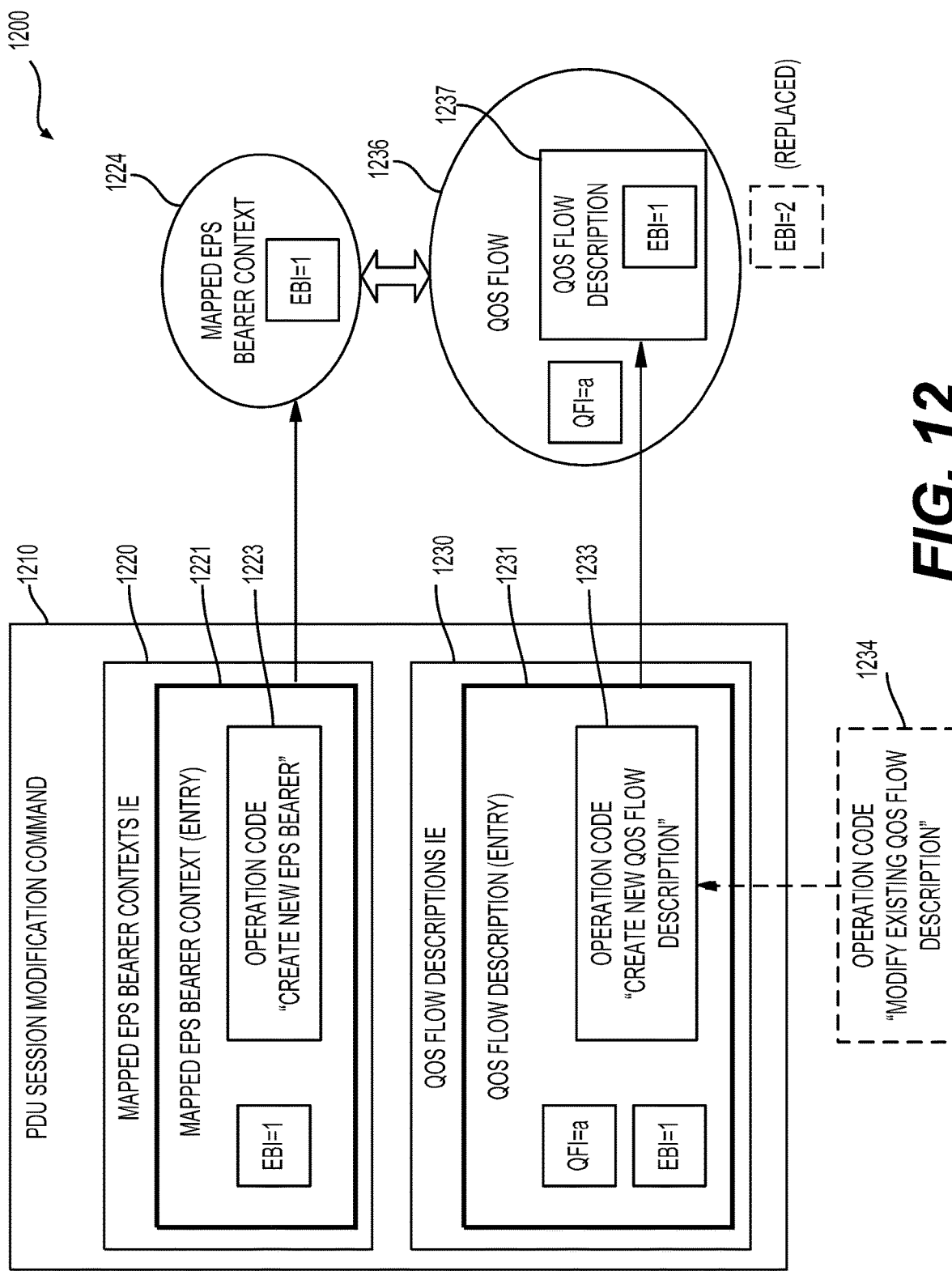
FIG. 12 shows a PDU session modification example 1200.

FIG. 12 shows a PDU session modification example 1200. In the example 1200, the UE 102 operates in N1 mode and is served by the 5GC 120 as shown in FIG. 1. The UE 102 is connected with the DN 140 with the established PDU session 104. The UE 102 can then receive a PDU session modification command message 1210 from the SMF 123. The PDU session modification command message 1210 can include a "create new EPS bearer" operation code 1223 and a corresponding QoS flow description entry 1231, both of which are associated with a same EBI=1.

As shown, the PDU session modification command message 1210 can include a mapped EPS bearer contexts IE 1220. The mapped EPS bearer contexts IE 1220 can include a mapped EPS bearer context entry 1221 that includes the EBI=1 and the "create new EPS bearer" operation code 1223. The PDU session modification command message 1210 can further include a QoS flow descriptions IE 1230. The QoS flow descriptions IE 1230 can include the QoS flow description entry 1231 that includes a QFI=a, the EBI=1, and a "create new QoS flow description" operation code 1233.

Upon receiving the PDU session modification command message 1210, based on the QoS flow description entry 1231, the UE 102 can create a QoS flow description 1237 that has the EBI=1 and is associated with a QoS flow of QFI=a. The QoS flow of QFI=a can be newly created (e.g., the PDU session modification command message 1210 includes a "create new QoS flow" operation code), or can be previously existing. Based on the mapped EPS bearer context entry 1221, the UE 102 can create a mapped EPS bearer context 1224 having the EBI=1. Based on the same EBI=1, the QoS flow 1236 and the mapped EPS bearer context 1224 can be associated with each other. The association is useful for converting the PDU session 104 to a PDN connection when the inter-system change of the UE 102 from N1 mode to S1 mode takes place.

In another example, the QoS flow description entry 1231 can include a "modify existing QoS flow description" operation code in place of the "create new QoS flow description" operation code. Accordingly, the UE 102 can modify the existing QoS flow description 1237 by replacing a prior EBI=2 with the EBI=1 carried in the QoS flow description entry 1231. In this way, the QoS flow of QFI=a, which is originally associated with a mapped EPS bearer context having the EBI=2 (not shown), becomes associated with the newly created mapped EPS bearer context 1224 having the EBI=1.

Figure 13:
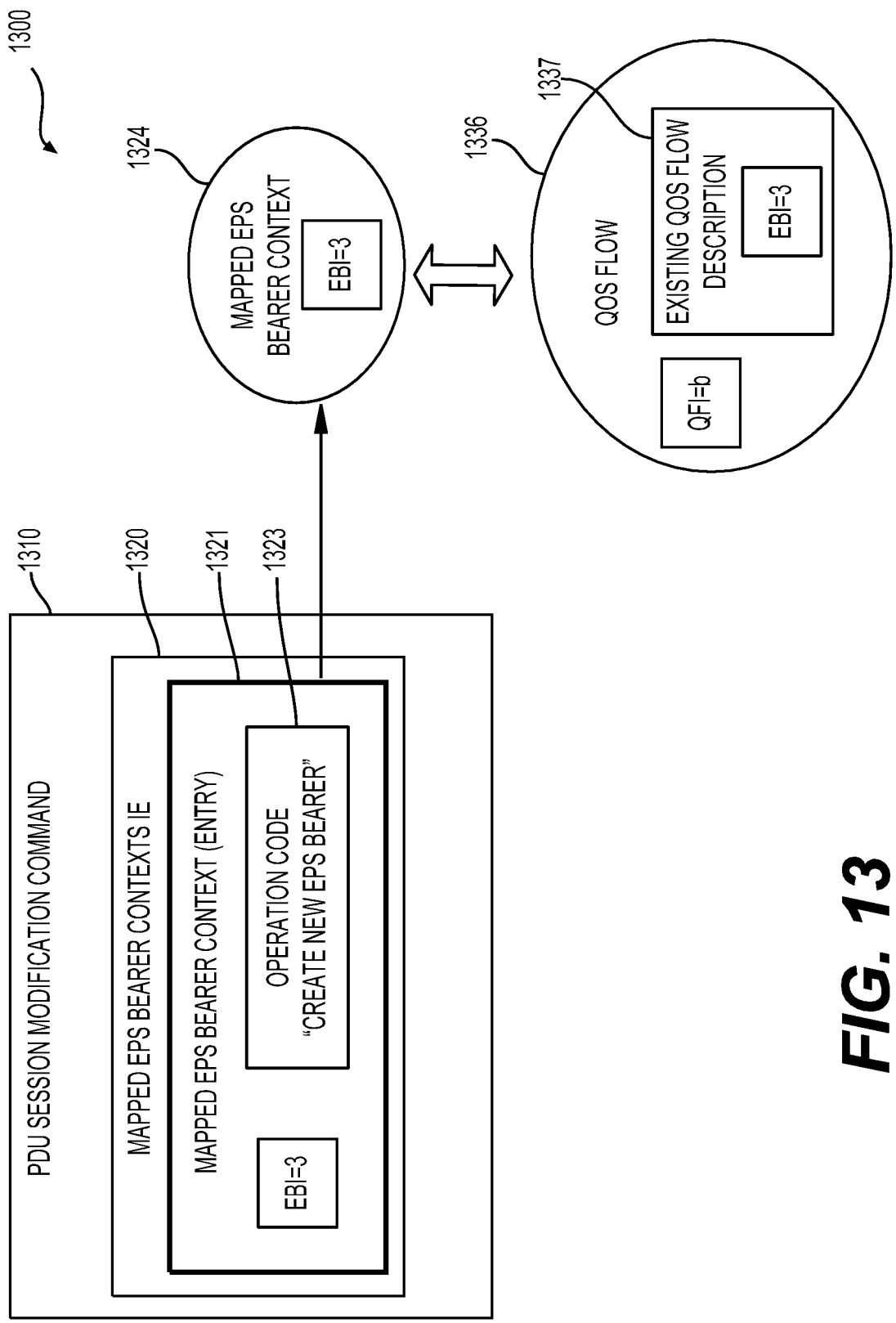
FIG. 13 shows another PDU session modification example 1300.

FIG. 13 shows another PDU session modification example 1300. In the example 1300, the UE 102 operates in N1 mode and is served by the 5GC 120 as shown in FIG. 1. The UE 102 is connected with the DN 140 with the established PDU session 104. The UE 102 can then receive a PDU session modification command message 1310 from the SMF 123. The PDU session modification command message 1310 can include a "create new EPS bearer" operation code 1323 but include no corresponding QoS flow description entry that is associated with a same EBI=3 as the "create new EPS bearer" operation code 1323. Instead, at the UE 102, a QoS flow of QFI=b is associated with the EBI=3.

As shown, the PDU session modification command message 1310 can include a mapped EPS bearer contexts IE 1320. The mapped EPS bearer contexts IE 1320 can include a mapped EPS bearer context entry 1321 that includes the EBI=3 and the "create new EPS bearer" operation code 1323. Upon receiving the PDU session modification command message 1310, based on the mapped EPS bearer context entry 1321, the UE 102 can create a mapped EPS bearer context 1324 having the EBI=3.

The QoS flow 1336 of QFI=b at the UE 102 can be previously established, and defined by a QoS flow description 1337 that includes a parameter of the EBI=3. However, the QoS flow 1336 of QFI=b previously does not have an associated mapped EPS bearer context configured. After the mapped EPS bearer context 1324 is created, based on the same EBI=3, the QoS flow 1336 and the mapped EPS bearer context 1324 can be associated with each other.

Figure 14:
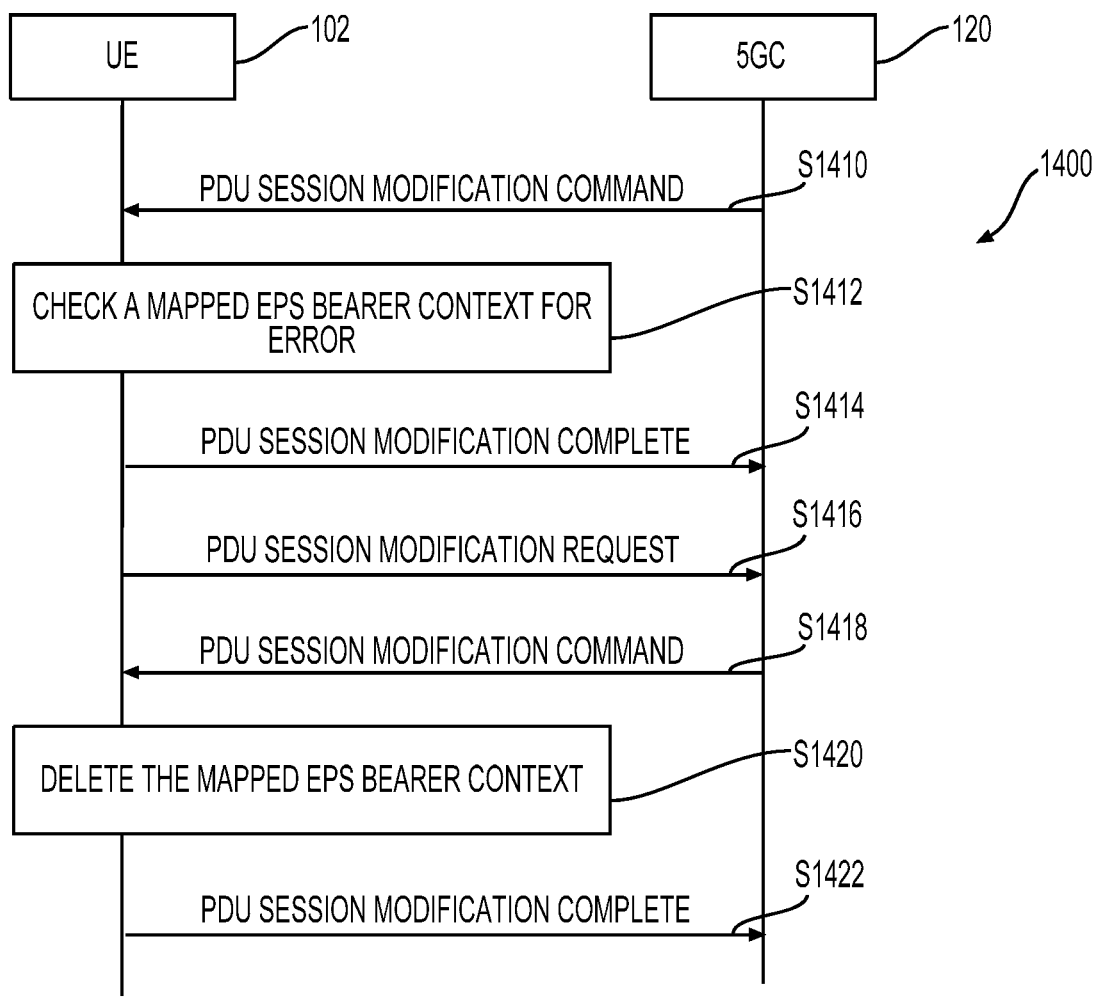
FIG. 14 shows a PDU session modification process 1400 according to an embodiment of the disclosure.

FIG. 14 shows a PDU session modification process 1400 according to an embodiment of the disclosure. The process 1400 can include steps from S1410 to S1422, and be performed between the UE 102 and the 5GC 120. During the process 1400, an error of a mapped EPS bearer context being indicated in a mapped EPS bearer contexts IE but having no associated QoS flow can be detected and handled. This type of error in a mapped EPS bearer context can be referred to as a flow-association-missing error.

For example, after sending a PDU session modification complete message, if a "create new EPS bearer" operation code in the mapped EPS bearer contexts IE is received in a PDU session modification command message and there is neither a corresponding authorized QoS flow descriptions IE in the PDU session modification command message nor an existing QoS flow description corresponding to the EBI included in the mapped EPS bearer context, the UE 102 can send a PDU session modification request message including a mapped EPS bearer contexts IE to delete the mapped EPS bearer context.

At S1410, a PDU session modification command message can be transmitted from the 5GC 120 to the UE 102. The PDU session modification command message can include a mapped EPS bearer contexts IE that includes a mapped EPS bearer context entry (or referred to as a mapped EPS bearer context in the mapped EPS bearer contexts IE). The mapped EPS bearer context entry can include a "create new EPS bearer" operation code for creating a mapped EPS bearer context. The PDU session modification command message may include other types of IEs, such as a QoS rules IE, a QoS flow descriptions IE, and the like.

At S1412, the UE 102 can check the mapped EPS bearer context for the flow-association-missing error. The checking can be performed with the mapped EPS bearer context created at the UE 102. For example, corresponding to the mapped EPS bearer context entry, based on the "create new EPS bearer" operation code, the mapped EPS bearer context can be created. The mapped EPS bearer context entry may provide an EBI. Accordingly, the created mapped EPS bearer context can be associated with this EBI. In addition, a list of EPS parameters, if any, can be stored in the mapped EPS bearer context. The checking can also be performed without the mapped EPS bearer context being created. Or, in other words, the checking can be performed with the to-be-created mapped EPS bearer.

In an embodiment, the UE 102 can perform an error checking process to determine whether the mapped EPS bearer context corresponding to the mapped EPS context entry received at S1410 has an associated QoS flow. If the mapped EPS bearer context does not have an associated QoS flow, an error can be determined to take place. In various examples, the error checking process can be performed before or after the mapped EPS bearer context is created, or without the mapped EPS bearer context being created. It is noted that the error checking operations described herein can be repeated for multiple mapped EPS bearer entries that each include a "create new EPS bearer" operation code in the mapped EPS bearer contexts IE received at S1410. It is possible that one, or more than one, such mapped EPS bearer entries may incur errors.

The error checking process can include the following steps. The UE 102 can first determine if the PDU session modification command message received at S1410 includes a corresponding authorized QoS flow descriptions IE that includes a QoS flow description entry including the same EBI as that of the mapped EPS bearer context. If such QoS flow description entry exists (such as the QoS flow description entry 1231 in the FIG. 12 example), the error checking process can terminate without an error being detected. Otherwise, the UE 102 can proceed to determine if there is an existing QoS flow description at the UE 102 corresponding to the EBI included in the mapped EPS bearer context. If such existing QoS flow description is found at the UE 102 (such as the QoS flow description 1337 in the FIG. 13 example), the error checking process targeting the flow-association-missing error can terminate without an error being detected. Otherwise, the UE 102 can determine that a flow-association-missing error takes place.

In another example, the UE 102 can first check if there is an existing QoS flow description at the UE 102 corresponding to the EBI included in the mapped EPS bearer context, followed by checking if the PDU session modification command message received at S1410 includes a corresponding authorized QoS flow descriptions IE that includes a QoS flow description entry including the same EBI as that of the mapped EPS bearer context.

It is noted that, in some examples, the error detected in the mapped EPS bearer context does not cause the UE 102 to discard the authorized QoS rules IE and authorized QoS flow descriptions IE included in the PDU session modification command message, if any. For example, if the PDU session modification command message includes the authorized QoS rules IE, the UE 102 can process the QoS rules sequentially starting with the first QoS rule. The UE can replace the stored authorized QoS rules, authorized QoS flow descriptions and session-AMBR of the PDU session 104 with the received value(s), if any, in the PDU session modification command message.

In addition, the UE 102 may process other mapped EPS bearer context entries, if any. In addition, the UE 102 may perform other error checking processes to check various types of errors related with the QoS rules, the QoS flow descriptions, or other mapped EPS bearer contexts indicated in the PDU session modification command message.

At S1414, a PDU session modification complete message can be transmitted from the UE 102 to the 5GC 120.

At S1416, a PDU session modification request message can be transmitted when there is neither an authorized QoS flow descriptions IE in the PDU session modification command message indicating a QoS flow description corresponding to the EBI in the mapped EPS bearer context, nor an existing QoS flow description at the UE 102 corresponding to the EBI included in the mapped EPS bearer context. The PDU session modification request message can include a mapped EPS bearer contexts IE to delete the mapped EPS bearer context (created at the UE 102) with the flow-association-missing error detected at S1412.

For example, the mapped EPS bearer contexts IE can include a mapped EPS bearer context entry indicating the erroneous mapped EPS bearer context (e.g., using the EBI) and including a "delete existing EPS bearer" operation code. Upon receiving the PDU session modification request, the 5GC 120 may understand the flow-association-missing error takes place with the mapped EPS bearer context indicated to the UE 102 at the S1410.

At S1418, in response to S1416, the 5GC 120 can transmit a second PDU session modification command message to the UE 102 that can contain a mapped EPS bearer contexts IE to remove the erroneous mapped EPS bearer context. At S1420, the UE 102 can accordingly delete the erroneous mapped EPS bearer context in response to receiving the second PDU session modification request message. At S1422, the UE 102 can transmit a second PDU session modification complete message to the 5GC 120 to reply to the second PDU session modification request message. The process 1400 can terminate after S1418.

Figure 15:
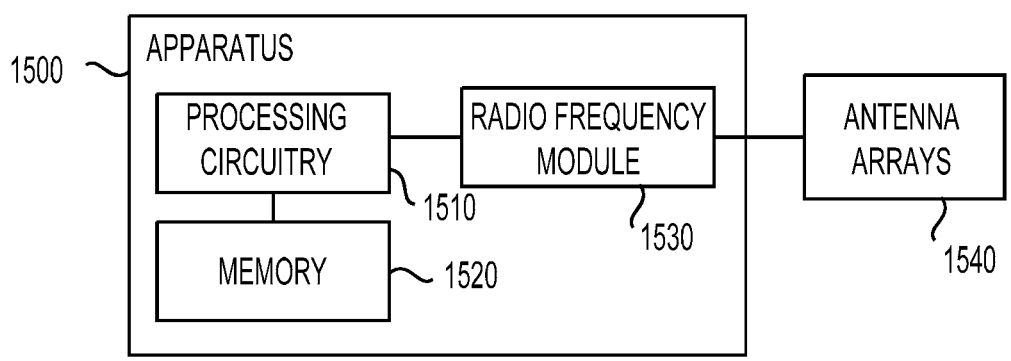
FIG. 15 shows an exemplary apparatus 1500 according to embodiments of the disclosure.

FIG. 15 shows an exemplary apparatus 1500 according to embodiments of the disclosure. The apparatus 1500 can be configured to perform various functions in accordance with one or more embodiments or examples described herein. Thus, the apparatus 1500 can provide means for implementation of mechanisms, techniques, processes, functions, components, systems described herein. For example, the apparatus 1500 can be used to implement functions of UEs, base stations, and elements of core networks in various embodiments and examples described herein. The apparatus 1500 can include a general purpose processor or specially designed circuits to implement various functions, components, or processes described herein in various embodiments. The apparatus 1500 can include processing circuitry 1510, a memory 1520, and optionally a radio frequency (RF) module 1530.

In various examples, the processing circuitry 1510 can include circuitry configured to perform the functions and processes described herein in combination with software or without software. In various examples, the processing circuitry 1510 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 1510 can be a central processing unit (CPU) configured to execute program instructions to perform various functions and processes described herein. Accordingly, the memory 1520 can be configured to store program instructions. The processing circuitry 1510, when executing the program instructions, can perform the functions and processes. The memory 1520 can further store other programs or data, such as operating systems, application programs, and the like. The memory 1520 can include non-transitory storage media, such as a read only memory (ROM), a random access memory (RAM), a flash memory, a solid state memory, a hard disk drive, an optical disk drive, and the like.

In an embodiment, the RF module 1530 receives a processed data signal from the processing circuitry 1510 and converts the data signal to beamforming wireless signals that are then transmitted via antenna arrays 1540, or vice versa. The RF module 1530 can include a digital to analog converter (DAC), an analog to digital converter (ADC), a frequency up converter, a frequency down converter, filters and amplifiers for reception and transmission operations. The RF module 1530 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 1540 can include one or more antenna arrays.

The apparatus 1500 can optionally include other components, such as input and output devices, additional or signal processing circuitry, and the like. Accordingly, the apparatus 1500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving an operation code of creating a new evolved packet system (EPS) bearer in a mapped EPS bearer contexts information element (IE) in a first protocol data unit (PDU) session modification command message for creating a mapped EPS bearer context at a user equipment (UE) in a wireless communication system; and
when a quality of service (QoS) flow descriptions IE indicating a QoS flow description corresponding to an EPS bearer identity (EBI) in the mapped EPS bearer context is absent from the first PDU session modification command message, and a QoS flow description corresponding to the EBI included in the mapped EPS bearer context is absent from the UE, sending a PDU session modification request message including a mapped EPS bearer contexts IE to delete the mapped EPS bearer context.

2. The method of claim 1, further comprising:
sending a PDU session modification complete message in response to receiving the PDU session modification command message.

3. The method of claim 1, further comprising:
determining whether there is the QoS flow descriptions IE in the first PDU session modification command message indicating the QoS flow description corresponding to the EBI in the mapped EPS bearer context.

4. The method of claim 1, further comprising:
determining whether there is the QoS flow description at the UE corresponding to the EBI included in the mapped EPS bearer context.

5. The method of claim 1, further comprising:
processing one or more QoS rules in a QoS rules IE or one or more QoS flow descriptions in a QoS flow descriptions IE included in the PDU session modification command message.

6. The method of claim 1, further comprising:
receiving a second PDU session modification command message including a mapped EPS bearer contexts IE to delete the mapped EPS bearer context; and
deleting the mapped EPS bearer context.

7. The method of claim 1, further comprising:
deleting the mapped EPS bearer context locally without receiving a second PDU session modification command message including a mapped EPS bearer contexts IE to delete the mapped EPS bearer context.

8. An apparatus, comprising circuitry configured to:
receive an operation code of creating a new evolved packet system (EPS) bearer in a mapped EPS bearer contexts information element (IE) in a first protocol data unit (PDU) session modification command message for creating a mapped EPS bearer; and
when a quality of service (QoS) flow descriptions IE indicating a QoS flow description corresponding to an EPS bearer identity (EBI) in the mapped EPS bearer context is absent from the first PDU session modification command message, and a QoS flow description corresponding to the EBI included in the mapped EPS bearer context is absent from the apparatus, send a PDU session modification request message including a mapped EPS bearer contexts IE to delete the mapped EPS bearer context.

9. The apparatus of claim 8, wherein the circuitry is further configured to:
send a PDU session modification complete message in response to receiving the PDU session modification command message.

10. The apparatus of claim 8, wherein the circuitry is further configured to:
determine whether there is the QoS flow descriptions IE in the first PDU session modification command message indicating the QoS flow description corresponding to the EBI in the mapped EPS bearer context.

11. The apparatus of claim 8, wherein the circuitry is further configured to:
determine whether there is the QoS flow description corresponding to the EBI included in the mapped EPS bearer context.

12. The apparatus of claim 8, wherein the circuitry is further configured to:
process one or more QoS rules in a QoS rules IE or one or more QoS flow descriptions in a QoS flow descriptions IE included in the PDU session modification command message.

13. The apparatus of claim 8, wherein the circuitry is further configured to:
receive a second PDU session modification command message including a mapped EPS bearer contexts IE to delete the mapped EPS bearer context; and
delete the mapped EPS bearer context.

14. The apparatus of claim 8, wherein the circuitry is further configured to:
delete the mapped EPS bearer context locally without receiving a second PDU session modification command message including a mapped EPS bearer contexts IE to delete the mapped EPS bearer context.

15. A non-transitory computer-readable medium storing instructions that, when executed by a processor, cause the processor to perform a method, the method comprising:
receiving an operation code of creating a new evolved packet system (EPS) bearer in a mapped EPS bearer contexts information element (IE) in a first protocol data unit (PDU) session modification command message for creating a mapped EPS bearer context at a user equipment (UE); and
when a quality of service (QoS) flow descriptions IE indicating a QoS flow description corresponding to an EPS bearer identity (EBI) in the mapped EPS bearer context is absent from the first PDU session modification command message, and a QoS flow description corresponding to the EBI included in the mapped EPS bearer context is absent from the UE, sending a PDU session modification request message including a mapped EPS bearer contexts IE to delete the mapped EPS bearer context.

16. The non-transitory computer-readable medium of claim 15, wherein the method includes:
sending a PDU session modification complete message in response to receiving the PDU session modification command message.

17. The non-transitory computer-readable medium of claim 15, wherein the method includes:
determining whether there is the QoS flow descriptions IE in the first PDU session modification command message indicating the QoS flow description corresponding to the EBI in the mapped EPS bearer context.

18. The non-transitory computer-readable medium of claim 15, wherein the method includes:
determining whether there is the QoS flow description corresponding to the EBI included in the mapped EPS bearer context.

19. The non-transitory computer-readable medium of claim 15, wherein the method includes:
processing one or more QoS rules in a QoS rules IE or one or more QoS flow descriptions in a QoS flow descriptions IE included in the PDU session modification command message.

20. The non-transitory computer-readable medium of claim 15, wherein the method includes:
receiving a second PDU session modification command message including a mapped EPS bearer contexts IE to delete the mapped EPS bearer context; and
deleting the mapped EPS bearer context.

* * * * *